United States Patent [19]
Catron et al.

[11] 3,979,727
[45] Sept. 7, 1976

[54] MEMORY ACCESS CONTROL CIRCUIT

[75] Inventors: Brittain Norman Catron; Eugene Francis Dumstorff; Phillip Christian Schloss; Larry Lloyd Schroeder, all of Rochester, Minn.

[73] Assignee: International Business Machines Corporation, Armonk, N.Y.

[22] Filed: Sept. 7, 1973

[21] Appl. No.: 395,335

Related U.S. Application Data

[63] Continuation-in-part of Ser. No. 267,731, June 29, 1972, abandoned.

[30] Foreign Application Priority Data
Apr. 24, 1973  Canada .................. 170059

[52] U.S. Cl. ............................................ 340/172.5
[51] Int. Cl.² ................... G06F 9/20; G06F 9/16; G06F 11/12
[58] Field of Search ................. 340/172.5; 445/1

[56] References Cited
UNITED STATES PATENTS

| | | | |
|---|---|---|---|
| 3,573,856 | 4/1971 | Best et al. ................ | 340/172.5 |
| 3,579,198 | 5/1971 | Giunta .................... | 340/172.5 |
| 3,593,297 | 7/1971 | Kadner ................... | 340/172.5 |
| 3,599,176 | 8/1971 | Cordero .................. | 340/172.5 |
| 3,634,833 | 1/1972 | Kreidermacher ......... | 340/172.5 |
| 3,646,522 | 2/1972 | Furman et al. .......... | 340/172.5 |
| 3,675,214 | 7/1972 | Ellis et al. .............. | 340/172.5 |
| 3,689,895 | 9/1972 | Kitamura ................ | 340/172.5 |
| 3,704,448 | 11/1972 | Osborne ................. | 340/172.5 |
| 3,707,703 | 12/1972 | Sakai ..................... | 340/172.5 |
| 3,713,108 | 1/1973 | Edstrom et al. ......... | 340/172.5 |
| 3,815,103 | 6/1974 | Holtey et al. ........... | 340/172.5 |

*Primary Examiner*—Gareth D. Shaw
*Assistant Examiner*—Jan E. Rhoads
*Attorney, Agent, or Firm*—Robert W. Lahtinen

[57] ABSTRACT

In a control unit having a read only memory, a control program is provided which has provision for all features with which the machine may be equipped and for a selected number of future features. The control program contains one or more mainline control loops which interrogate mainline and feature functions sequentially to determine whether a function requires service. If a function is present and requires service, the appropriate routine is executed whereafter the mainline control program proceeds to execute the next indicated control program instruction. If a function is present, but does not require service, a normal return or other procedure is executed to return to the control loop. When a feature is addressed which is not present, a feature return is executed forcing the control program back to the instruction following the last branch.

2 Claims, 2 Drawing Figures

MEMORY ACCESS CONTROL CIRCUIT

BACKGROUND OF THE INVENTION

This application is a continuation in part of our co-pending application Ser. No. 267,731 filed June 29, 1972, now abandoned.

This invention pertains to microprogrammed, data processing units and more particularly to such a processor using a read only memory.

An economical approach for a low cost processor is the use of a read only memory for control store; however, this type device usually lacks flexibility when it is necessary to accomodate changes due to further development or varying functional selections to meet the requirements of the individual user. Most devices include both those functions that are standard or included in every machine of the type and other functions that are optionally available to personalize a particular device to the users requirements. As used herein a series of mainline routines is provided by a base ROS which supplies service to mainline functions that are in every machine and features are those functions that are optionally available to tailor or personalize the machine to particular requirements. Feature routines which are resident on ROS modules, form a part of the control unit ROS and are addressed simultaneously with the base ROS portion of the memory. Since all functions are addressed in parallel the ROS memory may be utilized to address mainline and feature functions in any sequence. The mainline program provides one or more mainline control loops where sequences of steps which address a series of functions, determine whether service is required and where required proceed to execute the associated routine. Additionally there are in any viable on-going development program, future features or functions that are not currently available, including those which have not been conceived and some scheme must be available to accommodate this type of function. It is possible to personalize or tailor the base program or ROS for the particular feature mix selected for an individual device, but this causes a proliferation of part numbers as each feature combination must be considered. A further disability of such a procedure is the inability to cope with the need to add future features not currently anticipated or known.

Using the technique of the present invention, a mainline control program is provided using a base ROS which in addition to routines for servicing mainline functions those in every machine of the type, includes branches for features with which the device may be optionally equipped and in addition selected branches which may be used for expansion to incorporate future features which may not be currently included or may not presently be known.

When the device is operating, the control program recirculates through a sequence of instructions in a wait loop testing whether a status change has occurred requiring service to a mainline or feature function. The wait loop circulates through a series of decisions, each associated with a line control loop, to sense whether a status change has occurred within that loop that requires service by the controller. When such a status change is sensed, the control program processes through the appropriate mainline control loop testing whether a sequence of mainline functions and feature functions require service. If an addressed feature is installed and requires service, the subroutine associated therewith is executed. When the feature is present, but does not require service, control logic effects a normal return to the mainline control loop. When the control program branches to a feature which is not present in the device either because it was not installed or because the branch was provided for a future feature also not installed, the instruction execution register senses the absence of the recognition of an address at that branch location and forces a return to the instruction following the last branch taken by the mainline control loop. When a routine is executed, whether a mainline or feature routine, the next occurrence may be a return to the wait loop, a return to the mainline loop instruction sequence, or a jump to any indicated address in the control sequence.

Accordingly, a single read only memory or storage device provides the mainline control program for the family of devices irrespective of either the feature mix selected by the user or the possible future features that might subsequently be added to such family of devices.

It is an object of the present invention to provide a device control unit wherein a single nonchangeable base structure functions to effect the control program irrespective of the feature mix of the associated unit. It is also an object of the invention to provide a control unit with a single base memory structure that will accommodate expansion for undefined features by the addition of ROS routines.

The foregoing and other objects, features and advantages of the invention will be apparent from the following more particular description of a preferred embodiment of the invention, as illustrated in the accompanying drawings.

DETAILED DESCRIPTION

Figure 1:
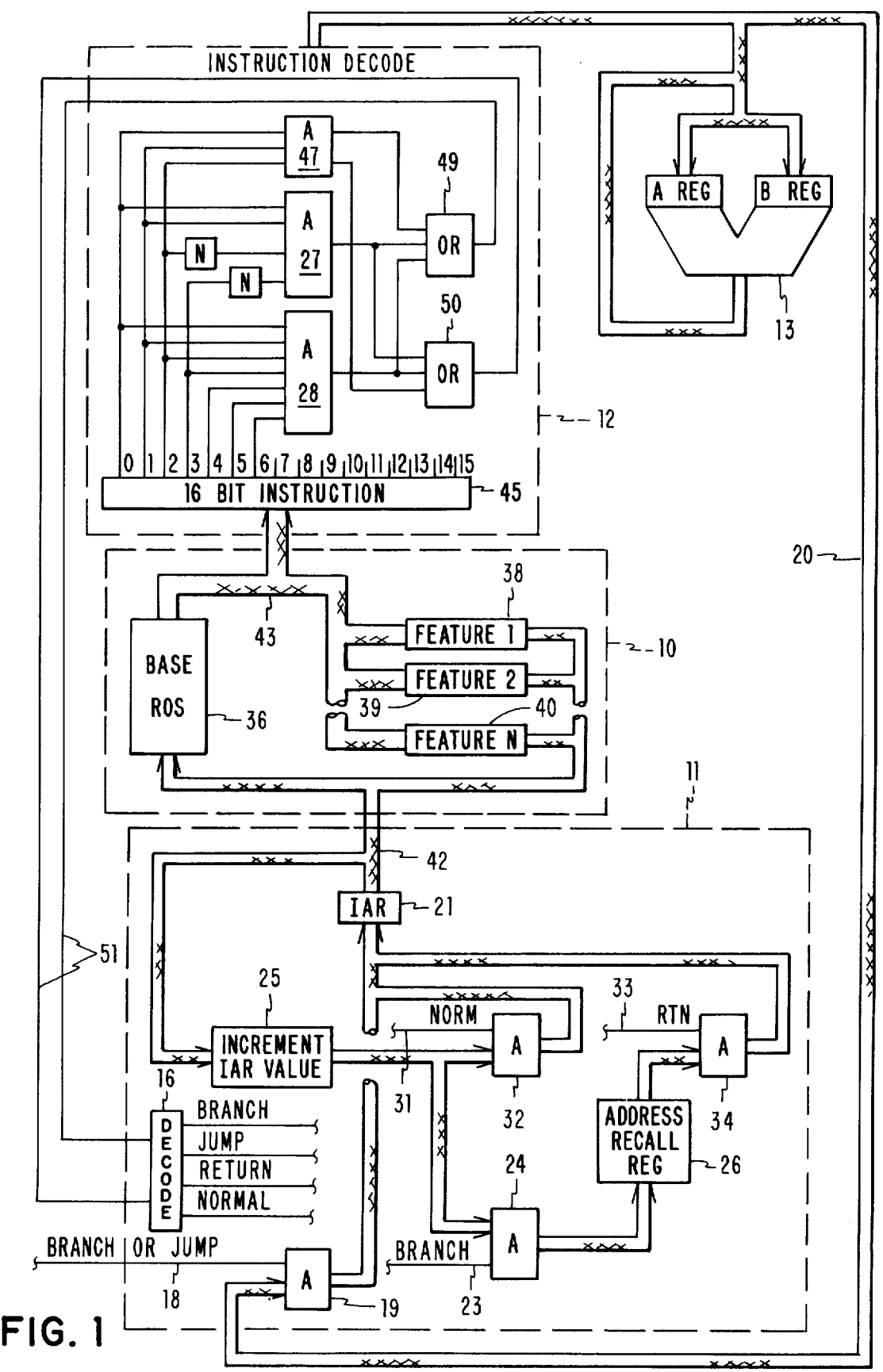
FIG. 1 shows a partial schematic block diagram of a microprogrammed control unit using a read only memory and including control logic for implementing the present invention.

The portion of the control unit shown in FIG. 1 includes the read only memory module 10, instruction address module 11, instruction execution module 12 and ALU 13. An instruction from ROS memory 10 to instruction execution module 12 is received and decoded. A portion of the 16 bit instruction, as shown in the high order positions, is decoded to identify the address of the next cycle. This decode produces a 2 bit output that is transmitted to decode 16 of instruction address module 11. This 2 bit signal is decoded to indicate a branch, jump, return or normal address sequence condition. On either a branch or jump the line 18 enables AND 19 causing an address from data path 20 to be gated to instruction address register (IAR) 21. If the next address is a jump, a new sequence is established and the information from the old address is not retained. In the case of a branch, the output is also supplied on line 23 to AND 24 causing the incremented IAR value in register 25 to be gated to address recall register 26 for retention. When a normal sequence is indicated the output on line 31 enables AND 32 to gate incremented IAR value in register 25 to IAR 21. On the occurrence of a return, a signal on line 33 enables AND 34 to gate the address retained in address recall register 26 on the occurrence of the prior branch, to be gated to IAR 21.

From IAR 21 an address, which in the illustrated example is 8 bits wide, is transmitted to control store 10. Control store module 10 includes the base ROS module 36 which contains the mainline routines which pertain to functions resident in all machines of the type and therefore require no alteration, as well as the control program instuction sequences. In addition to base ROS module 36 the control store 10 includes such feature routines in separate ROS modules 38, 39 and 40 to provide the optional functions required by a particular user. All of the ROS modules are addressed in parallel (including both mainline base ROS and the feature ROS units). When a function of the base ROS 36 is addressed, either a need for service is determined followed by the function routine if such service is required or in those cases where service is always provided execution of the routine is initiated with the first instruction cycle. This mode of operation uniformly occurs since the base ROS is present in every machine of the type.

The feature ROS modules 38, 39, 40: illustrated in FIG. 1 as features 1, 2 through N; are optionally present in the various machines in accordance with the manner in which the apparatus is personalized or customized to meet the functional requirements of the user. When a feature is addressed and found to be installed, the routine proceeds in the regular manner, first testing a need for service where appropriate and thereafter executing a routine where service is required.

The control ROS 10 operates by having an address received on data path 42 cause an instruction to be transmitted on data path 43 to latches 45 of instruction execution module 12. The instruction is decoded and transmitted on bi-directional data path 20 to ALU 13 and also to other register devices (not shown) which may be addressed.

A portion of the decode, which is illustrated here, is directed to the control of the next subsequent cycle. The 16 bit instruction is received in a series of 16 latches 45 in instruction execution module 12. The three high order bits of each instruction are connected to decode 47, before high order bits are connected to AND 27 and the 7 high order bits are connected to AND 28. The outputs of decode 47, AND 27 and AND 28 are connected to three-way ORS 49, 50 to produce the two bit output code transmitted on lines 51 to the instruction address module decode 16 indicative of a branch, jump, return or normal sequence.

The first 4 bit positions operating through decode 47 and AND 27 normally indicate the operation of the next instruction cycle. When it occurs that a feature is addressed that has not been installed in the device, the address on the data path 42 to ROS module 10 results in no output on the instruction data path 43. This unique instruction, or rather the lack of an instruction, causes zeros to be resident in all latch positions 45 of instruction execution module 12, which effectively constitutes an instruction with binary zeros in all bit positions. Since there is no valid instruction in the device having zeros in all 7 high order bits, such 7 high order bits may be interrogated rather than all 16 bits to indicate the lack of an instruction or that a non-resident function has been addressed. When AND 28 is satisfied the output supply to ors 49 and 50 induces a forced return on lines 51. Since the result is the same, that is to use the incremented address retained in the address recall register 34, both the forced return induced by satisfying AND 28 and the normal return caused by the output of AND 27 generate the same 2 bit output code on line 51 (see FIG. 3).

Figure 2:
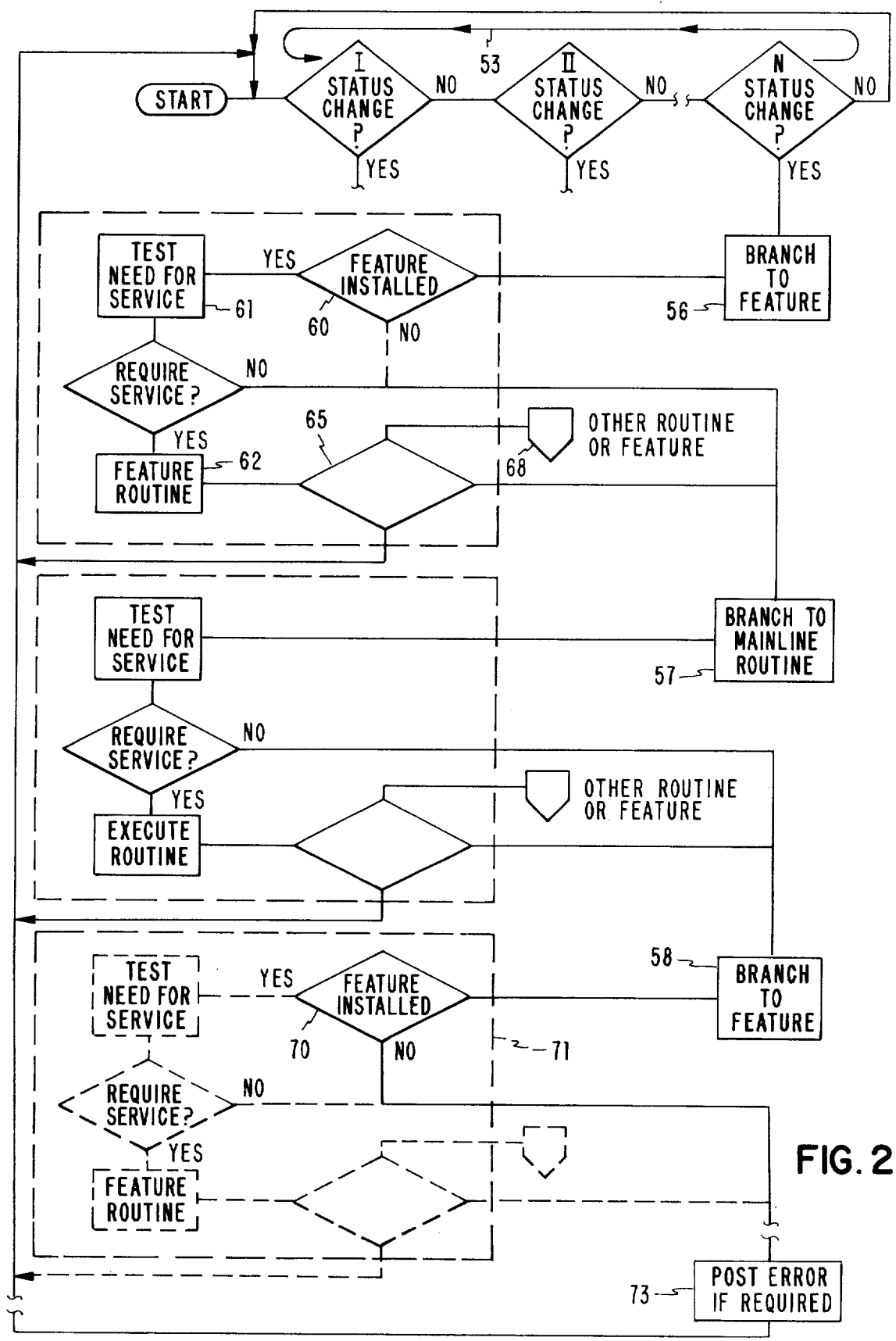
FIG. 2 is a flow chart illustrating representative hardware control elements of the present invention as applied to the mainline control program of the control unit of FIG. 1.

As seen in FIG. 2, after starting, the control routine normally recycles through a wait loop indicated by arrow 53 that includes a series of decision blocks I, II through N which test for the occurrence of a status change that requires service. When a status change is indicated, the instruction sequence progresses through the indicated control loop. A representative sequence of routine addresses are shown associated with the N status change decision block. When there is a signal that a function in the mainline control loop associated with status change N requires service, the instruction sequence will proceed to address the sequence of instructions in that control loop. When a feature is addressed, the mainline control loop, here partially illustrated by a series of branches 56, 57 and 58, branches to the feature. Initially the decision is made at 60 as to whether the feature is present. If present, the need for service is tested at 61 and where such is required the associated routine 62 is executed. If service is not required the instruction sequence returns to the next instruction in the mainline control loop being executed, to interrogate the succeeding function in the loop at branch 57.

When the feature routine is executed the instruction sequence thereafter, as shown at decision block 65, may direct a return to the wait loop, may return to the mainline control loop and proceed to branch 57 or may execute a jump to any other feature or routine at 68. Usually this decision does not exist in fact since a single one of the three possible exit conditions is predetermined.

Branch 57 indicates a branch to a routine in the base ROS or mainline routine which is accordingly always present. Therefore, there is no requirement that there be a test for the presence of the routine. Where the routine is not always executed, an initial few instructions are executed to test the need for service. If service is not required the instruction sequence returns to the mainline control loop to further seek the routine requiring service by progressing to the next branch 58. When service is required, the routine is executed and the instruction sequence is directed to the wait loop, to the mainline control loop or may jump to any other location in the instruction sequence in the same manner as a feature or any other routine.

As shown in the partition 71 when a feature is addressed that is not present, the lack of an instruction in response to an address is sensed at 70 and the instruction sequence is forced back to the mainline control loop to continue the instruction sequence. Since the flow chart of FIG. 2 is representative of hardware rather than a program, blocks such as decision 60 do not necessarily represent instructions. When a feature is not installed, the lack of an instruction in response to an address is latched in the instruction execution module 12 in latches 45 as an instruction containing 16 logical zeros. Accordingly the forced return consumes one instruction cycle. When the feature is present, the received valid instruction would immediately be executed as the first instruction in the sequence at 61 to determine the need for service, thus when the feature is present, the decision block 60 is ignored as the first instruction is executed as a part of the test and consequently in such instance the decision block is not indicative of the consumption of an instruction cycle. As shown in FIG. 2 if the condition were to occur where no need for service were identified in the machine control loop after the status change was indicated at the wait loop status change decision block, an error condition would be posted at 73.

Although only three branch conditions are shown, to indicate a mainline function and features that are present or absent, the actual control loop sequences are of considerable length. The instruction sequences contain many hundreds of instructions and by way of example there are normally feature provisions in excess of 50. Known features are provided by branches within the instruction sequence at the appropriate location. Provision for future features is provided by inserting feature branch conditions or "hooks" at numerous selected locations in the instruction sequence. By providing an early branch condition it is possible to almost completely rewrite the basic program by adding appropriate instructions to the feature address at this stage of the mainline control sequence, although such a practice would probably not be economically practical. If a branch condition is provided which is not located within the control loop sequence at the desired location is necessary to duplicate some of the instructions succeeding the branch to effectively place the branch to the feature functions at the necessary location within the sequence.

The mainline functions and feature functions are intermixed in the control instructions sequence in any manner required by the service requirements of the controlled device. The mainline routines are illustrated using a branch; however, this may take other forms including directly entering a routine that is invariably executed whenever a given point in the control loop instruction sequence is reached.

A single machine instruction sequence is utilized in unaltered form for any feature mix in a given device to accommodate any current features that may later be added and also any presently undefined features which may in the future be installed at prepared branch addresses. In addition other modifications may be made. For example, when the instruction sequence branches to a routine, such routine may terminate, not in a normal return, but in a jump to a future feature address. If a feature responding to that address has been installed in the read only memory module 10, that feature can modify the result of the routine. If the feature is not installed in the read only memory module 10, the next instruction executed will be a forced return which takes control back to the instruction following the branch to such non-installed feature.

While the invention has been particularly described with reference to a preferred embodiment thereof, it will be understood by those skilled in the art that various changes in form and details may be made therein without departing from the spirit and scope of the invention.

What is claimed is:

1. A microprogrammed processor for a data handling device including a read only control store and an execution register for receiving and storing the output of said control store in response to an address and comprising:
    address means including an instruction address register connected to said control store for supplying an address to said control store and including next address identifying means for identifying the next address to be gated to said instruction address register,
    said next address identifying means including means for incrementing the current address and means for storing such incremented address upon command in an address recall register, said next address identifying means further including means for gating to said address register said incremented address stored during a prior processor instruction cycle,
    said next address identifying means further including decode means operatively connected to the output of said execution register for selecting the next address to be gated to said instruction address register from the group including the said incremented current address, a new address, and said prior stored incremented address,
    logic means connected to the output of predetermined bit positions of said execution register for determining the next address operation and outputting a binary signal indicative of such operation,
    said logic means including circuit means connected to the output of said execution register to cause an output from said circuit means indicative of zero logic levels at all execution register bit positions to override the output of said logic means and produce a signal at the output of said logic means indicative of the operation which gates said prior stored incremented address to the instruction address register.

2. The microprogrammed processor of claim 1 wherein said circuit means comprises
    an AND circuit connected to the outputs of selected bit positions of said execution register less than the total number of said execution register bit positions,
    such bit positions being selected as being indicative of the existence of a zero logic level at all execution register bit positions when a zero logic level is resident at all selected bit positions.

* * * * *